Figures 1, 3:
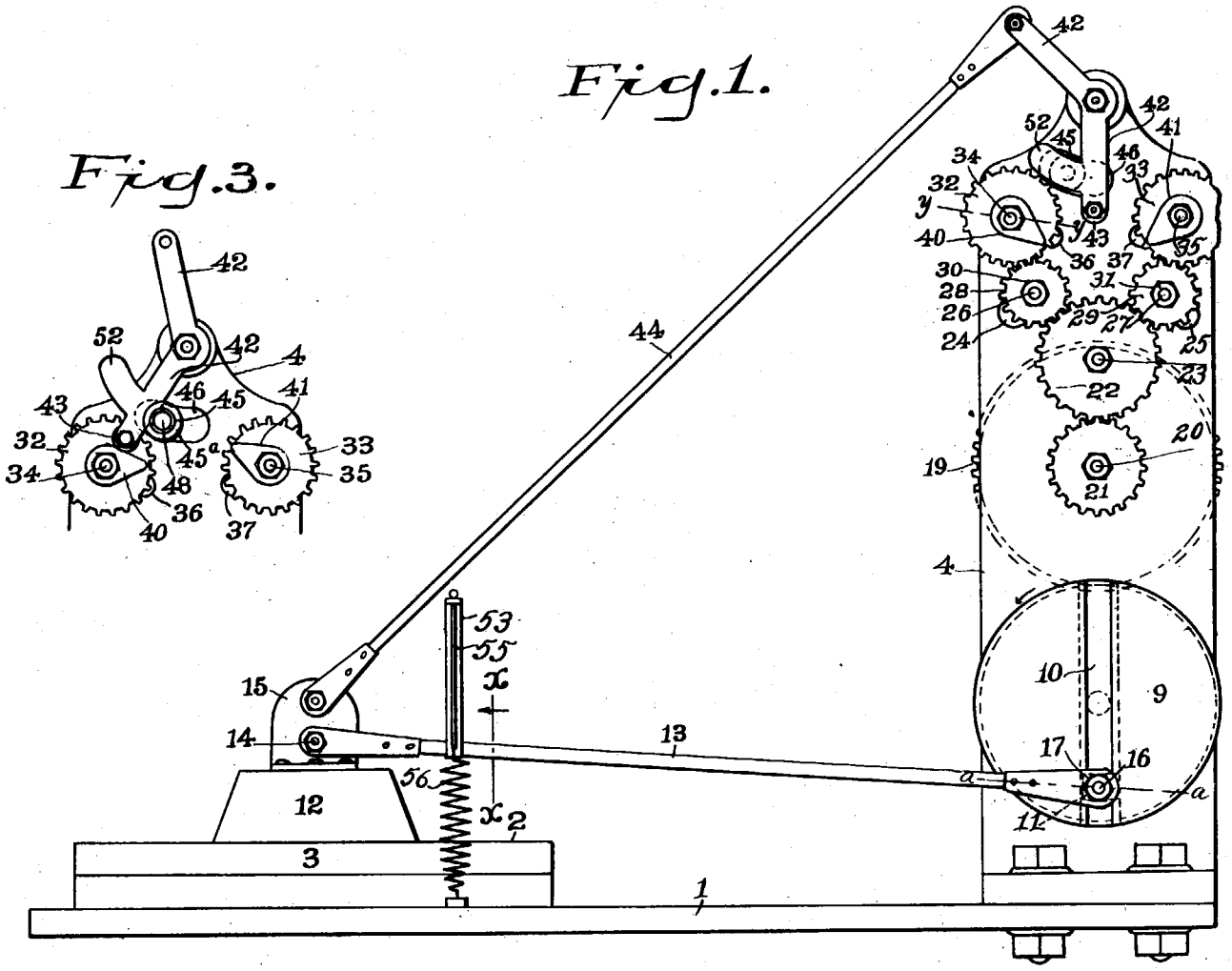

E. E. NORTON & A. U. LANGENEGGER.

IRONING MACHINE.

APPLICATION FILED SEPT. 25, 1912.

Reissued Jan. 14, 1913. 13,513.

2 SHEETS—SHEET 1.

WITNESSES:

H. A. Lamb.

M. T. Longden

INVENTORS

E. E. Norton.

A. U. Langenegger.

BY G. W. Smith

ATTORNEY

E. E. NORTON & A. U. LANGENEGGER.
IRONING MACHINE.
APPLICATION FILED SEPT. 25, 1912.
Reissued Jan. 14, 1913.
13,513.
2 SHEETS—SHEET 2.
Fig. 2.
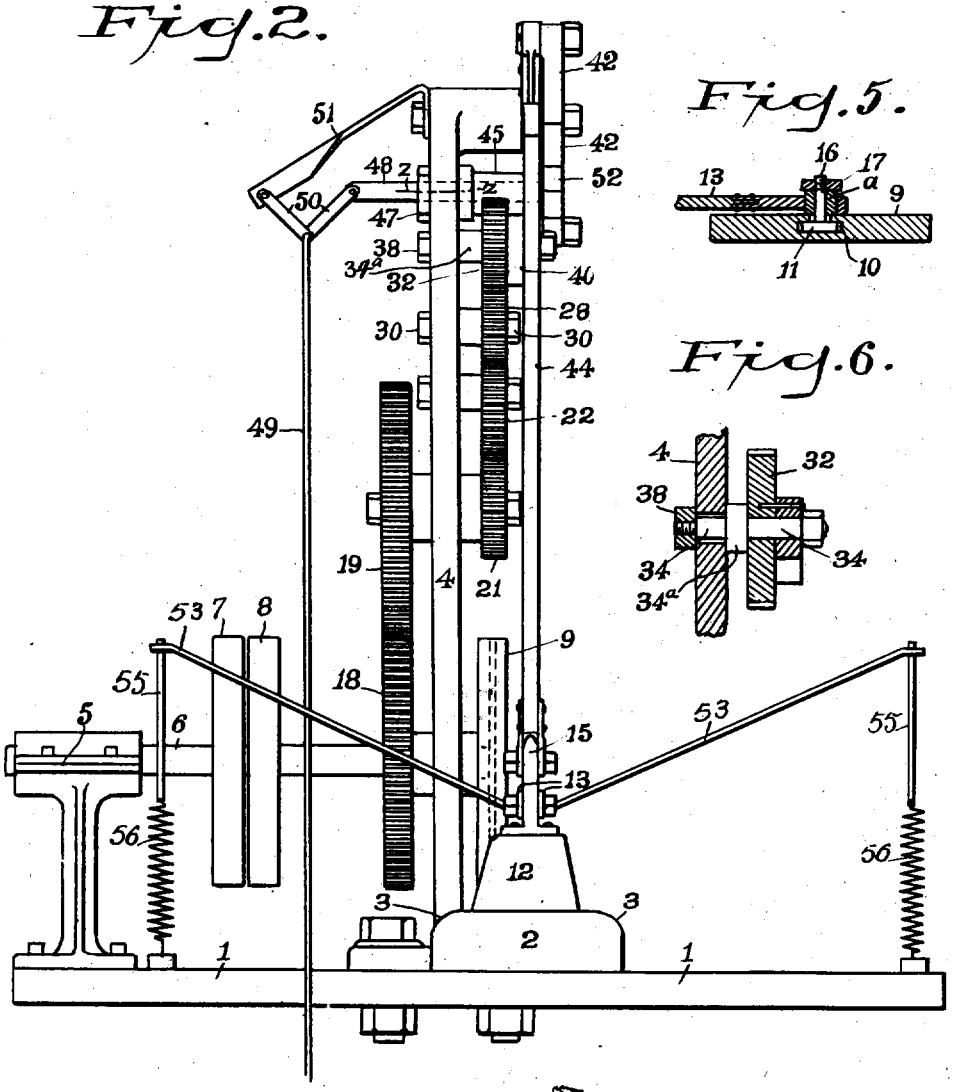
Fig. 5.
Fig. 6.
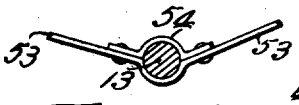
Fig. 4.
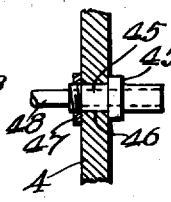
Fig. 7.
WITNESSES:
H. A. Lamb.
M. T. Longden
INVENTORS
E. E. Norton.
A. U. Langenegger.
BY F. W. Smith Jr.
ATTORNEY

UNITED STATES PATENT OFFICE.

EUGENE E. NORTON AND ALBERT U. LANGENEGGER, OF BRIDGEPORT, CONNECTICUT, ASSIGNORS TO THE KING MACHINE COMPANY, OF BRIDGEPORT, CONNECTICUT, A CORPORATION OF CONNECTICUT.

IRONING-MACHINE.

13,513. Specification of Reissued Letters Patent. Reissued Jan. 14, 1913.

Original No. 1,034,139, dated July 30, 1912, Serial No. 663,587. Application for reissue filed September 25, 1912. Serial No. 722,373.

*To all whom it may concern:*

Be it known that we, EUGENE E. NORTON and ALBERT U. LANGENEGGER, both citizens of the United States, residing at Bridgeport, in the county of Fairfield and State of Connecticut, have invented certain new and useful Improvements in Ironing-Machines; and we do hereby declare the following to be a full, clear, and exact description of the invention, such as will enable others skilled in the art to which it appertains to make and use the same.

Our invention relates to certain improvements in ironing machines but more particularly relates to machines of this description that are used to iron surfaces by forward and backward movements of the iron.

Our invention has for its object to provide a very efficient machine of this nature and to make provisions whereby all parts of the iron shall be entirely elevated above the plane of the ironing board at the ends of the forward and backward movements of the iron either for the purpose of shifting the goods beneath the iron or for the removal of the goods and the substitution of others.

With these ends in view our invention consists in certain details of construction and combination of parts hereinafter fully set forth and then particularly pointed out in the claims which conclude this description.

In the accompanying drawing Figure 1 is a side elevation of our improved machine—Fig. 2 a front elevation—Fig. 3 a broken detail side elevation of the coöperating parts which effect the removal or elevation of the iron—, Fig. 4 a detail broken section at the line *x*, *x*, of Fig. 1—Fig. 5 is a detail sectional view, on the line *a*—*a* of Fig. 1, illustrating the manner of connecting the disk with the rod which propels the iron; Fig. 6 a detail sectional view, taken on the line *y*—*y* of Fig. 1; and Fig. 7 a detail sectional view, taken on the line *z*—*z* of Fig. 2.

Similar numerals of reference denote like parts in the several figures of the drawing.

1 is the bed of the machine and 2 the ironing board or table mounted thereon and having the upper corners of its sides round as shown at 3 for the purpose hereinafter to be explained.

4 is a standard secured to the bed and rising vertically therefrom, and 5 is a bearing likewise bolted to the bed at a distance from the standard, and within this bearing and standard is journaled the power shaft 6 carrying the usual power pulleys 7, 8. Secured to the extremity of said shaft remote from the bearing 5 is a disk 9 which has an undercut way 10 extending diametrically throughout the outer face of this disk, and 11 is a block, Fig. 5, within this way and normally adapted to slide freely therein.

12 is the iron of any suitable and approved structure which is adapted to be heated in any ordinary manner, and 13 is a rod one extremity of which is pivoted at 14 to an extension 15 that is secured to the top of the iron, while the other end of said rod is pivoted around a collar *a*, Fig. 5, that loosely surrounds a stud 16 that extends from the block 11, the latter being secured in any adjustment along the way 10 in any ordinary manner as by a nut 17 driven around said stud and against the collar *a*.

From the above description it will be readily understood that as the disk 9 revolves the rod 13 will act as a crank rod and will cause the iron to be moved forward and backward across the board 2 this forward and backward movement being limited according to the normal distance of the block 11 from the axial center of rotation of said disk.

Rigid on the shaft 6 is a spur gear 18 which meshes with a spur gear 19 rigid on a short shaft 20 that is journaled to the standard 4, and rigid on the other extremity of this short shaft 20 is a spur gear 21 that meshes with a comparatively large idle spur gear 22 on the short shaft 23 that is supported by said standard.

24, 25, are arcuate slots within the standard and through these slots extend short shafts 26, 27, and loose on these shafts are spur gears 28, 29, which are in mesh with the spur gear 22, said short shafts being secured in any adjustment throughout said slots by means of nuts 30, 31.

32, 33, are spur gears supported by short shafts 34, 35, that are capable of adjustment throughout arcuate slots 36, 37, within the standard 4, this adjustment being effected in the usual manner by the manipulation of nuts 38, as in Fig. 6. Rigid with the gears 32, 33, are cams 40, 41, and said gears mesh with the spur gears 28, 29, so that it will be readily understood that as the disk 9 revolves, the gears 32, 33, and the cams 40, 41, will likewise revolve through the medium of the gears 18, 19, 21, 22, 28, and 29.

34[a], Fig. 6, are collars rigid on the shafts 34, 35, and abutted against the standard 4, so that it will be clearly understood that these shafts 34, 35, in their adjustments throughout the arcuate slots 36, 37, are confined between the nuts 38, and the collars 34[a].

42 is a bell crank lever pivoted at its angle portion at the top of the standard 4 and carrying at its lower end a roll 43, and 44 is a rod whose extremities are pivoted respectively to the extension 15 and to the upper extremity of the bell crank 42.

The operation of our improvement is as follows:—Pre-supposing the disk to be revolved in the direction denoted by the arrow the iron 12 will be moved rearwardly or toward the standard 4, and this will cause the lower end of the bell crank lever 42 to be moved forward into the position substantially as shown at Fig. 3, and the iron will then be at the end of its inward stroke, and meanwhile the cam 40 will have been brought into position against the roll 43 so that the continued movement of said cam will force the lower end of the bell crank still farther forward, thereby causing all parts of the iron to be entirely elevated above the plane of the ironing board. As the cam 40 continues to revolve it will leave the roll 43, whereupon the iron will descend and again be supported by the ironing board. On the return movement of the iron caused by the revolution of the disk 9 said iron will be moved toward the other end of the ironing board until it reaches the extremity of its movement, and this will cause the lower end of the bell crank lever to be thrown in a direction opposite to that shown at Fig. 3, so that the cam 41 in its revolution will strike against the roll 43 and throw said end forward likewise effecting the elevation of the iron, and when this cam has passed the roll the iron will descend and rest upon the ironing board as in the first instance, and this operation will continue as the disk 9 continues to revolve unless some means is employed to hold the lower end of the bell crank so that it cannot be swung back after contact with the cams 40, 41 has ceased.

It is sometimes advantageous to hold the lower end of the bell crank so that the iron may have its forward and backward movements without any contact with the ironing board, as in the instance of goods whose removal from and placement on the ironing board consumes more or less time, and therefore we have provided certain means for accomplishing this purpose which we will now describe.

45 is a sleeve, see Fig. 7, that extends through an arcuate slot 46 in the standard and is adjustable therealong and may be secured in any desired adjustment by the manipulation of the nut 47 in conjunction with a collar 45[a] rigid around said sleeve. Loosely extending through this collar is a bolt 48. 49 is a vertically disposed rod and 50 are links whose upper extremities are pivoted respectively to the heel end of the bolt 48 and to a bracket 51 that extends from the top of the standard while the lower extremities of these links are pivoted to the upper end of the rod 49. When the rod is moved upwardly the bolt will be projected and when this rod is moved downwardly the bolt will be withdrawn. After the lower extremity of the bell crank has been thrown sufficiently forward, either by the inward movement of the iron or by the action of the cam 40, the rod 49 is thrust upwardly thus causing the bolt 48 to be projected behind the bell crank, as shown in Fig. 3, thereby enabling the iron to be held in elevation at the end of its rearward stroke, in which position it is farthest from the operator. In order to prevent any accidental throw of the bolt a lateral extension 52 from the lower leg of the bell crank is provided which blocks at all times the locking action of the bolt except when the bell crank is in the position above described.

In the drawing, reference being had to Fig. 1, the parts are adjusted for substantially the greatest movement of the crank rod 13 and consequently the iron 12, but in case a shorter throw or movement is desired, the block 11 is merely adjusted to a position nearer the axis of rotation of the disk 9, and this will cause the lower leg of the bell crank to reciprocate in a shorter arc, thereby rendering it necessary to adjust the spur gears 28, 29, outwardly through the slots 24, 25, and to adjust the gears 32, 33, with their cams 40, 41, inwardly through the slots 36, 37, so that said cams will properly engage the roll 43 at the proper times. This shortening of the stroke of the iron will also render it necessary to adjust the collar 45 inwardly in the slot 46 so that the bolt 48 may be able to lock the bell crank at the end of its limited forward throw. These adjustments, however, are mere mechanical expedients that are well known and on which we base no part whatsoever of our invention.

We prefer that the pressure of the iron against the goods to be ironed shall be somewhat increased without adding to the weight of the iron itself and at the same time it is desirable that this pressure shall be yielding, and we have therefore provided certain means to bring this result about, which we will now describe.

53 is a yoke which at its middle portion extends beneath the crank rod 13 and is secured thereto by means of a clip 54 placed over said rod and fastened to the yoke on opposite sides of the rod, as clearly shown at Fig. 4. From the extremities of this yoke depend pins 55 and coil springs 56 are provided whose extremities are secured respectively to the lower ends of these pins and to the bed 1, so that it will be clear that the pressure of the iron will not only be increased but will be rendered resilient or yielding.

It will of course be readily understood that the degree to which the iron is elevated depends upon the action of the cams 40, 41, against the roll 43, and it will be clear that a shortening of the lower leg of the bell crank or of the cams themselves will bring about a decreased final throw of said leg so that it is possible merely to lessen the pressure of the iron against the surface to be ironed, and we therefore do not wish to be limited in this respect.

We prefer to round the side edges of the ironing board as shown at 3 to facilitate the pulling or shifting of the goods beneath the iron, and for the further purpose of taking care of parts that have more or less fullness.

It will be observed that there are no projections above the plane of the ironing board and also that there are no obstructions whatsoever adjacent said board such as would interfere with the movements of the operator in manipulating the goods that are placed on the ironing board, and in these respects our invention possesses a great advantage, the means for elevating the iron above the board being remote from the ironing board.

We claim:—

1. In a machine of the character described, the combination of an iron, power driven means for continuously moving the iron in a plane forward and backward across the surface to be ironed, and instrumentalities timed and operated in harmony with said means for automatically elevating the iron at the ends of said forward and backward movements.

2. In a power-operated ironing machine, the combination of an ironing board, an iron normally supported on said board, a driving rod connected at one end to said iron, power actuated driving mechanism connected to the other end of said rod for automatically and continuously driving said iron forward and backward across the surface to be ironed, and automatic means for elevating all parts of the iron entirely above the plane of the ironing board and then lowering the iron back on to the board at the end of each forward and backward movement of the iron.

3. In a power-operated ironing machine, the combination of an ironing board, an iron normally supported on said board, power driven mechanism connected to said iron for automatically driving said iron forward and backward, automatic means for elevating the iron above the surface of the ironing board and then lowering the iron back on to said board at the end of each forward and backward movement of the iron, and means under the control of the operator for maintaining the iron elevated above the said board.

4. In a machine of the character described, the combination of an iron; power-driven means for moving the iron in a plane forward and backward across the surface to be ironed; and devices connected to the iron and automatically controlled for elevating the iron at the ends of said forward and backward movements.

5. In a machine of the character described, the combination of an iron, means for moving the iron in a plane forward and backward across the surface to be ironed, and mechanism automatically controlled and operated by said means for the spacing apart of said iron and surface at the ends of said forward and backward movements.

6. In a machine of the character described, the combination of an iron, a crank rod pivoted to said iron, a rotary disk to which the other end of said rod is pivoted and whereby said iron is caused to have forward and backward movements across the surface to be ironed, and means moving in harmony with said disk for elevating said iron above the surface to be ironed at the ends of said forward and backward movements.

7. In a machine of the character described, the combination of an iron, a crank rod pivoted to said iron, a rotary disk to which the other end of said rod is eccentrically pivoted and whereby said iron is caused to have forward and backward movements across the surface to be ironed, a pivoted bell crank lever, a rod whose ends are pivoted to said lever and iron, rotary projections adapted to be forced against said lever to throw the same whereby the iron is elevated, and devices moving in harmony with said disk for operating said projections at the ends of said forward and backward movements.

8. In a machine of the character described, the combination of an iron, a crank rod pivoted at one end to said iron, a rotary disk to which the other end of said rod is eccentrically and adjustably pivoted, a second rod pivoted at one end to said iron, means connected to the other end of said second rod for elevating the iron above the ironed surface, and mechanism operating in harmony with said disk for actuating said means at the ends of the forward and backward movements of said iron.

9. In a machine of the character described, the combination of the bed, the vertical standard secured thereto, the ironing board supported on said bed, the iron normally supported by said board, the power shaft, the rotary disk carried by said shaft, the crank rod pivoted at one end to said iron and having its other end eccentrically and adjustably secured to said disk whereby the rotation of the latter will effect outward and inward movements of said iron across the surface to be ironed, the bell crank pivoted to the top of said standard, the rod having its extremities pivoted respectively to said iron and to the upper leg of said bell crank, rotary lifting devices in proximity to the extremity of the lower leg of said bell crank, mechanism intermediate of said disk and lifting devices whereby the rotation of said disk will cause said lifting devices to operate and to be forced against the lower leg of the bell crank at the ends of the outward and inward movements of said iron thereby causing the latter to be elevated, a bolt adapted to lock said lower leg in the position to which it has been forced when operated to elevate said iron at the end of the inward movement thereof, and means controlled by the operator for actuating said bolt.

10. In a machine of the character described, the combination of the bed, the vertical standard secured thereto, the ironing board supported on said bed, the iron normally supported by said board, the power shaft, the rotary disk carried by said shaft, the crank rod pivoted at one end to said iron and having its other end eccentrically and adjustably connected to said disk whereby the rotation of the latter will effect outward and inward movements of said iron across the surface to be ironed, the bell crank pivoted to the top of said standard, the rod having its extremities pivoted respecively to said iron and to the upper leg of said bell crank, rotary lifting devices in proximity to the extremity of the lower leg of said bell crank, and mechanism intermediate of said disk and lifting devices whereby the rotation of said disk will cause said lifting devices to operate and to be forced against the lower leg of the bell crank at the ends of the outward and inward movements of said iron thereby causing the latter to be elevated.

In testimony whereof we affix our signatures in the presence of two witnesses.

EUGENE E. NORTON.
ALBERT U. LANGENEGGER.

Witnesses:
F. W. SMITH, Jr.,
M. T. LONGDEN.

Copies of this patent may be obtained for five cents each, by addressing the "Commissioner of Patents, Washington, D. C."